United States Patent [19]

Messervey

[11] 4,019,622
[45] Apr. 26, 1977

[54] DUAL WHEEL DISCHARGE FOR CAN TESTER

[75] Inventor: Harry Clifford Messervey, East Randolph, N.Y.

[73] Assignee: Borden, Inc., Columbus, Ohio

[22] Filed: Mar. 19, 1976

[21] Appl. No.: 668,701

[52] U.S. Cl. .............................. 198/441; 209/74 R; 198/369
[51] Int. Cl.² ........................................ B65G 47/32
[58] Field of Search ............ 198/31 AA, 22 B, 362, 198/365, 366, 369, 441, 480; 209/74 R

[56] References Cited

UNITED STATES PATENTS

| | | | |
|---|---|---|---|
| 2,064,437 | 12/1936 | Marasso | 198/31 AA |
| 2,627,346 | 2/1953 | Stone | 209/74 R |
| 2,714,439 | 8/1955 | Prickett et al. | 198/31 AA |
| 2,775,335 | 12/1956 | Simpson | 198/31 AA |
| 2,787,359 | 4/1957 | Gerecke | 198/31 AA |
| 2,821,300 | 1/1958 | Bofinger et al. | 209/74 R |
| 3,488,994 | 1/1970 | Messervey et al. | 209/74 R |
| 3,687,285 | 8/1972 | Messervey | 198/31 AA |

Primary Examiner—Johnny D. Cherry
Assistant Examiner—Richard K. Thomson
Attorney, Agent, or Firm—Geroge P. Maskas; Daniel D. Mast; George A. Kap

[57] ABSTRACT

A dual wheel discharge apparatus accepts or rejects cans taken from a can testing wheel. A transfer wheel removes both acceptable and reject cans from the test wheel. The second cooperating wheel is provided with positive action flippers that remove the rejected cans from the transfer wheel.

3 Claims, 6 Drawing Figures

DUAL WHEEL DISCHARGE FOR CAN TESTER

BACKGROUND OF THE INVENTION

This invention relates to an apparatus that can be used in conjunction with the can testing device for accepting good or rejecting bad cans. More specifically, two cooperating wheels remove and separate the good and bad cans from a test wheel.

Various star wheel devices have been used in the past to remove cans from a can tester wheel. One such device is shown in Messervey's U.S. Pat. No. 3,488,994. Two turrets, turning in opposite directions, both of which are provided with can holding magnets, and a diverter are used in U.S. Pat. No. 2,985,008, one of the references cited in U.S. Pat. No. 3,488,994. The teachings of these patents and their references represent past attempts to handle, at greater and greater speeds, the testing of cans. Although these patented devices have been used in the past, ever increasing speeds have caused the former devices to jam and malfunction.

SUMMARY OF THE INVENTION

The present invention provides a means for very positively lifting a rejected can from the transfer wheel to accomplish rejection at increased very high speeds.

It is an object to provide reject apparatus that enjoys long life and requires little or no maintenance.

It is an object to provide positive reject action in an apparatus that is virtually jam proof and faultless.

The invention will be better understood by reference to the drawings wherein.

Figure 1:
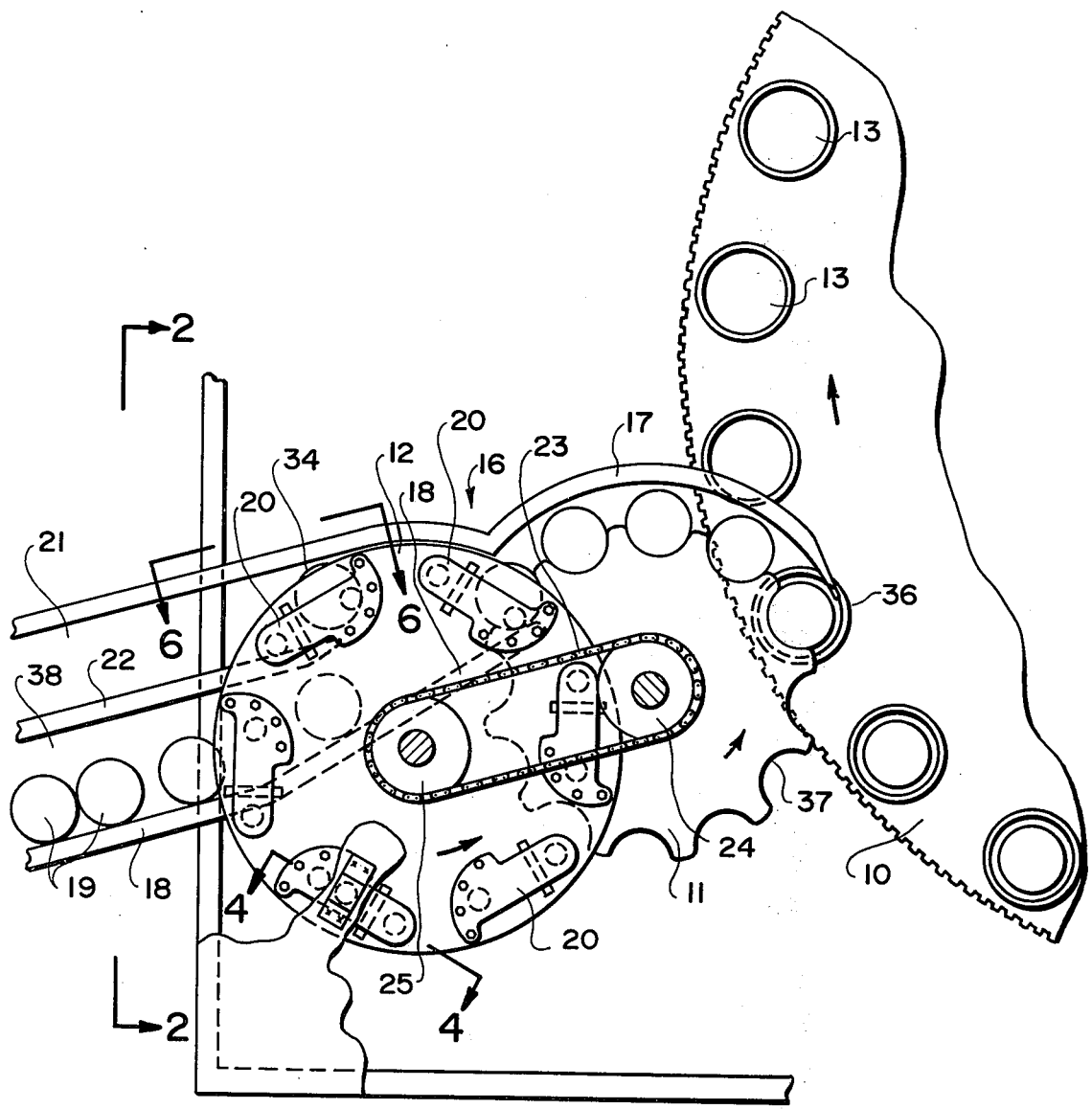
FIG. 1 is an elevational view of the test wheel and the two wheel transfer and discharge device.

The apparatus consists of a test wheel which has multiple test positions 13, 13. The test machines supply air to a chamber in which the can is to be tested and measure any change in pressure which occurs in the chamber due to leakage through the can wall.

Examples of these testing machines are described in Cameron patent U.S. Pat. No. 2,013,402 issued Sept. 3, 1935, and in U.S. Pat. No. 2,101,129 issued Dec. 7, 1937. The test positions 13, 13 include a test chamber 14, each of which is provided with a closure cap 15 hermetically sealing the test chamber, wherein the can is received. The testing of the can in a gaseous medium is more fully described in U.S. Pat. No. 2,013,402. Upon completion of the test, the cans are removed from the test chamber and they proceed around the test wheel remaining in their position until removed by the apparatus of the present invention. The removal apparatus 16 includes transfer wheel 11 and reject wheel 12, see FIG. 1. Around the periphery of the transfer wheel 11 is a top rail 17 that removes cans from test wheel 10. A bottom rail 18 extends into the double-disc transfer wheel 11 to remove acceptable cans 19, see FIG. 1.

Reject wheel 12 is provided with a plurality of flippers 20, 20. The particular apparatus shown in the drawings includes 6 flippers on each side of the double-disc reject wheel 12. The flippers on one side of the reject wheel are staggered with respect to the position of the flippers on the opposite side of the reject wheel so that there are 12 stations in the reject wheel. These stations match and coincide with the 12 positions of transfer wheel 11. A reject chute 21 is defined by a continuation of the top rail 17 and middle rail 22. Test wheel 10 drives transfer wheel 11 through a gear train not shown. The transfer wheel drives reject wheel 12 through chain 23 and sprockets 24, 25.

Figure 2:
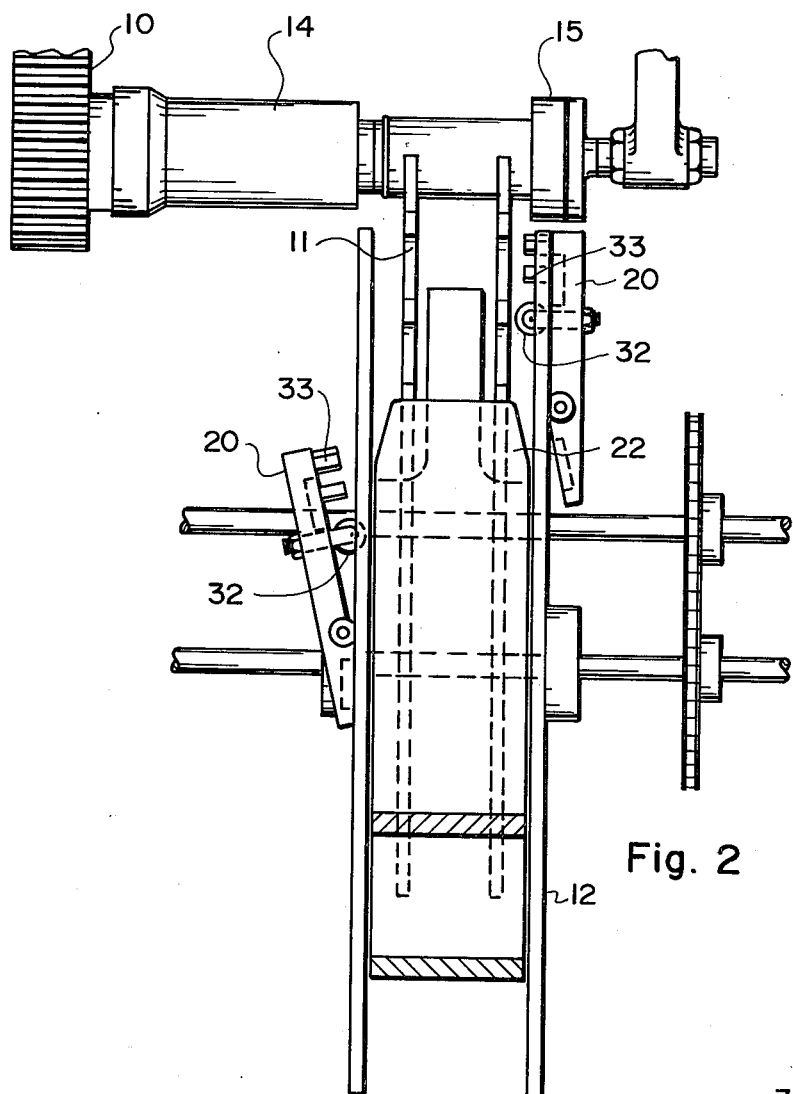
FIG. 2 is an elevational view, on line 2—2 of FIG. 1 showing the transfer and reject wheels.

In FIG. 2, flipper 20 is shown in the accept position on the left side of the view and in the reject position on the right hand side of the view. The flipper 20 is pivoted upon pin 26. Flipper 20 has a permanent magnet 27 which holds the flipper in the accept position. A second permanent magnet 28 holds the flipper in the reject position after the actuating cylinder 29 and roller 31 have pushed the flipper in the reject position shown in FIG. 5.

Figure 4:
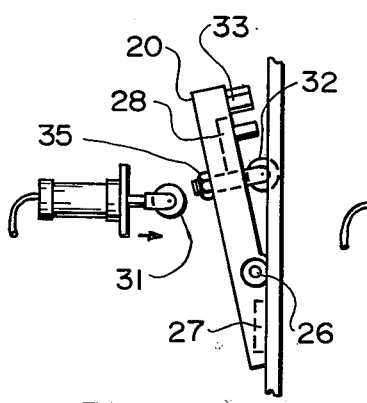
FIG. 4 is a detailed view of the flipper and the actuating roller in the "accept" position.
Figure 6:
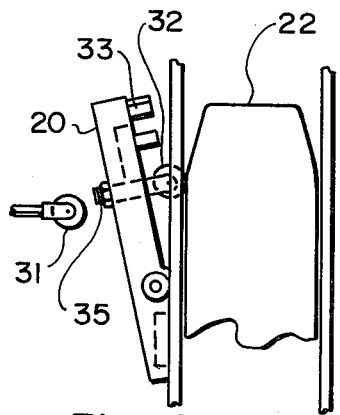
FIG. 6 is a view of the "flipper" and its reset wheel being positioned by the reject rail.
Figure 3:
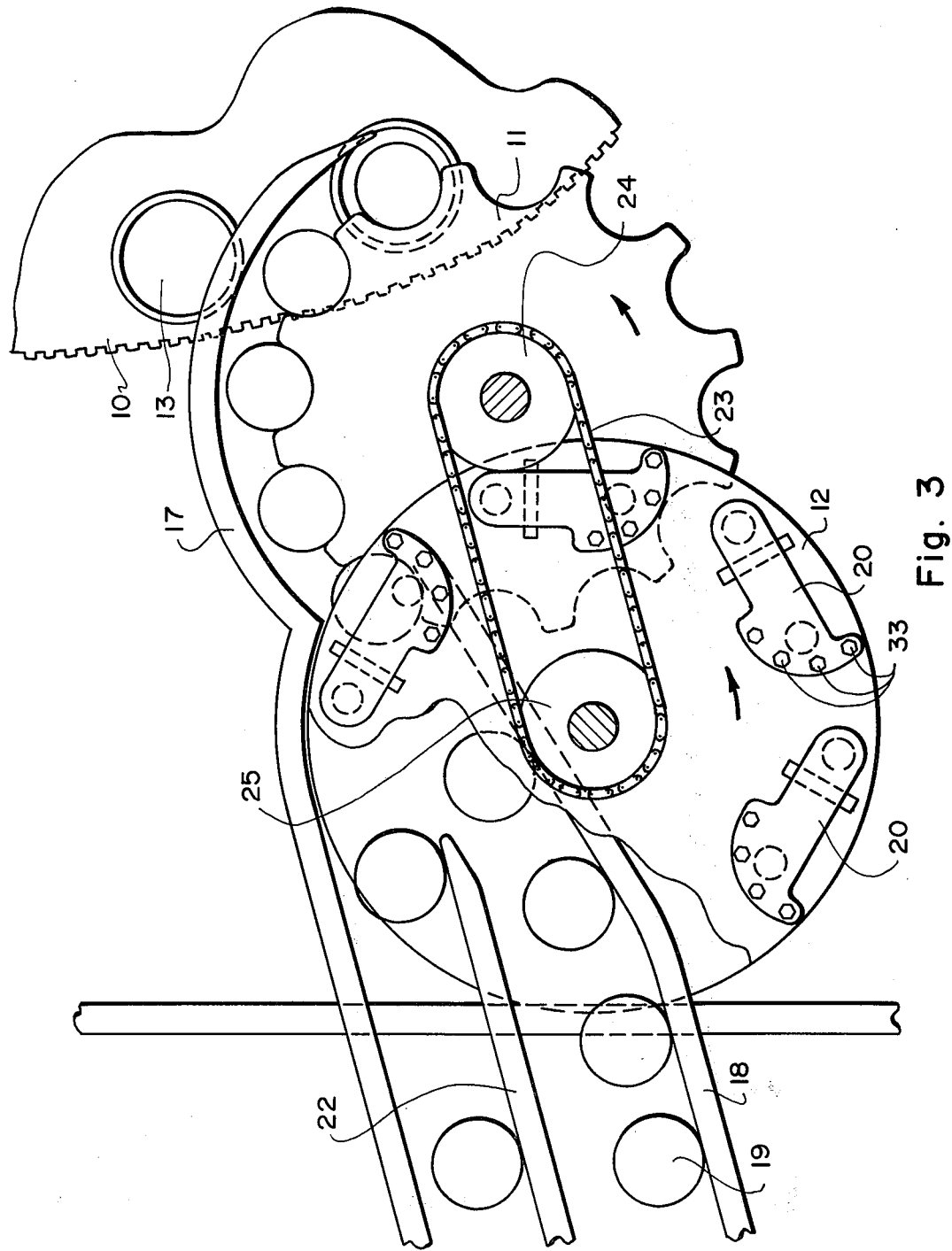
FIG. 3 is a side elevational view of the overlapping transfer and reject wheels.

Reset roller 32 rides up the tapered end of middle rail 22 to reset the flipper in the accept position, see FIG. 6. Flipper 20 is provided with three pins 33, 33 which protrude through the disc of the reject wheel and pick off the rejected can from the bottom rail 18 before the can is fully out of the transfer wheel pocket. The can is cradled by the pins 33, 33 of the flipper and directed to the reject chute 21. A rejected can 34 is shown in the flipper at the top of the reject wheel 12 in FIG. 1. Reset roller 32 is secured to flipper 20 by the bolt and hexnut 35, see FIG. 4.

Figure 5:
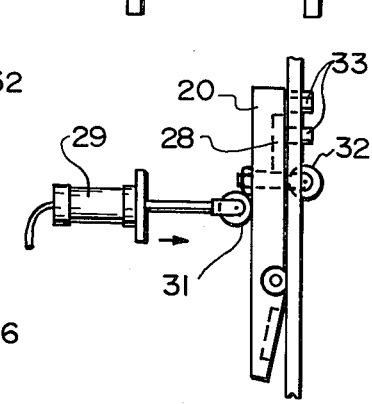
FIG. 5 is a similar view in the "reject" position.

The sensing and recording apparatus shown in FIG. 5 of Messervey and Riddel U.S. Pat. No. 3,488,994 is used in the present test wheel apparatus and is incorporated into the present disclosure by reference. Briefly, the test wheel is provided with a sensing and recording device that includes a pin for each of the pockets of the test wheel on a disc that revolves with the test wheel. A faulty can in the pocket causes the pin to be set so that the pin acutates the sensing device which in turn causes the actuating cylinder 29 and the flipper to operate.

In utilizing the apparatus shown in the drawings, cans are tested while making one revolution on the test wheel. A defective can causes a pin, that corresponds to its position, to be set so that a signal is sent to the reject mechanism of the reject wheel 12. The testing of the cans utilizing air pressure and the air leak detection and response apparatus is old but the dual-wheel discharge device shown in the drawings is new. The test wheel moves in a clockwise direction and, as the cans approach the take-off point or zone 36 shown in FIG. 1, the can is removed from the test wheel onto the transfer wheel by the action of the top rail 17 in cooperation with the arcuate slot 37 of transfer wheel 11. Transfer wheel 11 and reject wheel 12 revolve in a counter-clockwise direction as indicated in FIG. 1. The cans removed from the test wheel pass around the periphery of the transfer wheel and, if the can is an acceptable can, it is released into the accept chute 38 by the action of bottom rail 18. The acceptable cans 19, 19 pass down the accept chute 38 as shown in FIG. 1.

A defective can will be removed from the test wheel 10 and passed around the periphery of the transfer wheel 11 in the same manner as the acceptable can. However, when it reaches the reject wheel 12, the appropriate flipper 20 for that can will be preset in the reject position by the action of air cylinder 29 that has been actuated by a signal from the test device. Pins 33, 33 of the flipper 20 cause the can to be held between the two discs of the reject wheel 12 and passed along to reject chute 21. The rejected can 34 is placed upon the middle rail 22 so that it passes from the reject wheel down the reject chute 21. As the reject wheel and the flipper pass the end of middle rail 22, the reset roller 32 of the flipper passes over the tapered portion of the middle rail and causes the flipper to assume the accept position once more. The flipper remains in the accept position until it is moved by the action of air cylinder 29 into the reject position and this only happens when the test device has set the corresponding pin and sent the corresponding signal for a defective can to the actuating cylinder 29.

The advantages of this apparatus shown in the drawings include very fast operation. Cans can be tested at 1200 per minute and the reject and accept chutes are designed to handle the cans coming off of the transfer and reject wheels at those speeds. The flipper has very few moving parts so that maintenance is virtually not required. At the same time the flipper in cooperation with the reject wheel discs handles the rejected cans in a very positive fashion so that jam-ups are averted even at high speeds. It has been found that cans of various metals including steel and aluminum and various other materials can be handled on this apparatus.

Although specific embodiments have been shown, various modifications can be made within the spirit and scope of the following claims.

I claim:

1. In a switching mechanism for selectively diverting successive advancing articles, a first wheel having disposed about its periphery a plurality of spaced-apart pockets for engaging and supporting said advancing articles, a fixed member disposed about the periphery of said first wheel for cooperatively engaging and diverting one of said advancing articles and thereby depositing it in a pocket of said first wheel, a double-disc second wheel disposed adjacent to said first wheel so that one disc is on each side of said first wheel and the outer peripheries of the first and second wheel overlap, disposed about the periphery of said second wheel a plurality of equally spaced, two-position, hinged flippers secured to a disc of said second wheel, each of said flippers having a plurality of pins secured to said flipper, said disc having at least one opening therein to allow said pins to protrude into the space between said discs of said second wheel in such a manner as to support an advancing article between said discs when said flipper is in one position and to allow complete removal of said pins from said space between discs when the flipper is in the second position, and a permanent magnet associated with said hinged flipper to hold it in said one position and a second permanent magnet to hold said flipper in said second position.

2. The switching mechanism of claim 1 wherein the first and second wheels are connected by a chain and drive sprockets to assure synchronization of travel of a pocket of said first wheel with a hinged flipper of said second wheel.

3. The switching mechanism of claim 1 wherein one-half of said flippers spaced about the periphery of said second wheel are on each outer side of said second wheel and the flippers on one side are in a staggered relationship with the flippers on the opposite side of said wheel.

* * * * *

UNITED STATES PATENT OFFICE
CERTIFICATE OF CORRECTION

Patent No. 4,019,622　　　　　　　　　Dated April 26, 1977

Inventor(s) Clifford Harry Messervey

It is certified that error appears in the above-identified patent and that said Letters Patent are hereby corrected as shown below:

The inventor's name is CLIFFORD HARRY MESSERVEY, not Harry Clifford Messervey.

Signed and Sealed this

Eighteenth Day of October 1977

[SEAL]

Attest:

RUTH C. MASON　　　　　　　　LUTRELLE F. PARKER
Attesting Officer　　　　　Acting Commissioner of Patents and Trademarks